US011919106B2

(12) United States Patent
Bennett et al.

(10) Patent No.: US 11,919,106 B2
(45) Date of Patent: Mar. 5, 2024

(54) SYSTEMS AND METHODS FOR GLOBAL THERMAL CONTROL OF ADDITIVE MANUFACTURING

(71) Applicant: Northwestern University, Evanston, IL (US)

(72) Inventors: Jennifer Lynn Bennett, Gilberts, IL (US); Kornel Ehmann, Evanston, IL (US); Jian Cao, Wilmette, IL (US)

(73) Assignee: Northwestern University, Evanston, IL (US)

( * ) Notice: Subject to any disclaimer, the term of this patent is extended or adjusted under 35 U.S.C. 154(b) by 748 days.

(21) Appl. No.: 16/223,534

(22) Filed: Dec. 18, 2018

(65) Prior Publication Data

US 2019/0184494 A1    Jun. 20, 2019

Related U.S. Application Data

(60) Provisional application No. 62/607,091, filed on Dec. 18, 2017.

(51) Int. Cl.
*B23K 26/342* (2014.01)
*B23K 15/00* (2006.01)
(Continued)

(52) U.S. Cl.
CPC ........ *B23K 26/342* (2015.10); *B23K 15/0026* (2013.01); *B23K 15/0086* (2013.01);
(Continued)

(58) Field of Classification Search
CPC ... B29C 64/153; B29C 64/295; B29C 64/264; B29C 64/273; B29C 64/393;
(Continued)

(56) References Cited

U.S. PATENT DOCUMENTS

| 2014/0054817 A1* | 2/2014 | Jaffe | B29C 64/236 264/129 |
|---|---|---|---|
| 2015/0064047 A1* | 3/2015 | Hyde | B22F 3/1028 164/113 |

(Continued)

*Primary Examiner* — Nathaniel E Wiehe
*Assistant Examiner* — Dilnessa B Belay
(74) *Attorney, Agent, or Firm* — Banner & Witcoff, Ltd.

(57) ABSTRACT

A system for making a build using directed energy deposition is provided. The system includes a primary heat source; a processing nozzle movable relative to the build for delivering a metal powder, a carrier gas for the metal powder, and a shield gas to the build; a melt pool sensor for providing information regarding a temperature of a melt pool of the build; a secondary heat source separate from the primary heat source positionable relative to the build for delivering heat to a selected area of the build; a cooling source positionable relative to the build for delivering a cooling fluid to a selected area of the build; and a control system for operating the primary heat source, the secondary heat source and the cooling source to maintain a desired temperature profile for the build. The system preferably includes a temperature sensor for providing a temperature profile of the build. The temperature control system preferably includes a programmable controller configured to control the secondary heat source and the cooling source to conform the temperature of the build to the desired temperature profile. In one embodiment, the programmable controller is preprogrammed with a dynamic thermal model of a thermal history of the build for each time step.

17 Claims, 2 Drawing Sheets

(51) Int. Cl.

| | | |
|---|---|---|
| *B23K 15/02* | (2006.01) | |
| *B23K 26/03* | (2006.01) | |
| *B23K 26/082* | (2014.01) | |
| *B23K 26/14* | (2014.01) | |
| *B23K 26/146* | (2014.01) | |
| *B23K 26/70* | (2014.01) | |
| *B33Y 10/00* | (2015.01) | |
| *B33Y 30/00* | (2015.01) | |
| *B33Y 50/02* | (2015.01) | |

(52) U.S. Cl.
CPC .......... *B23K 15/0093* (2013.01); *B23K 15/02* (2013.01); *B23K 26/034* (2013.01); *B23K 26/082* (2015.10); *B23K 26/0821* (2015.10); *B23K 26/146* (2015.10); *B23K 26/1464* (2013.01); *B23K 26/70* (2015.10); *B23K 26/703* (2015.10); *B33Y 10/00* (2014.12); *B33Y 30/00* (2014.12); *B33Y 50/02* (2014.12)

(58) Field of Classification Search
CPC ..... B29C 64/386; B29C 64/30; B29C 64/268; B29C 64/135; B29C 64/371; B29C 64/245; B29C 64/277; B22F 10/20; B22F 12/00; B22F 10/00; B22F 10/30; B22F 5/04; B23K 26/70; B23K 15/02; B23K 15/0086; B23K 15/0093; B23K 26/034; B23K 26/1464; B23K 26/146; B23K 15/0026; B23K 26/082; B23K 26/703; B23K 26/0821; B23K 26/342; B23K 31/125; B23K 26/032; B23K 26/0622; B23K 26/0626; B23K 26/073; B23K 26/0006; B23K 26/34; B23K 15/0046; B23K 26/147; B23K 35/0244; B23K 26/144; B23K 26/32; B23K 15/002; B23K 26/1224; B23K 26/0853; B23K 26/1437; B23K 26/064; B23K 26/0608; B23K 26/0604; B33Y 30/00; B33Y 50/02; B33Y 10/00; B33Y 50/00; B33Y 40/00; B33Y 80/00; G05B 19/41875; G05B 19/4099; G05B 19/4093; G01N 21/00; G01N 21/71; G01N 21/8806; G01N 25/18; H01L 22/12; C30B 11/005; C30B 13/06; C30B 29/66; C30B 29/52; C30B 13/24; C30B 11/006; C30B 11/14; C30B 29/607; F01D 5/147; B23P 23/04; G06F 30/23

See application file for complete search history.

(56) References Cited

U.S. PATENT DOCUMENTS

| | | | |
|---|---|---|---|
| 2017/0014906 A1* | 1/2017 | Ng | B23K 26/703 |
| 2017/0102689 A1* | 4/2017 | Khajepour | G01N 25/18 |
| 2017/0136578 A1* | 5/2017 | Yoshimura | B33Y 30/00 |
| 2017/0252820 A1* | 9/2017 | Myerberg | B33Y 30/00 |
| 2017/0266759 A1* | 9/2017 | Fieret | B33Y 30/00 |
| 2018/0126671 A1* | 5/2018 | Wilenski | B29C 64/118 |
| 2019/0270247 A1* | 9/2019 | Hyatt | B29C 64/295 |

* cited by examiner

SYSTEMS AND METHODS FOR GLOBAL THERMAL CONTROL OF ADDITIVE MANUFACTURING

CONTRACTUAL ORIGIN OF THE INVENTION

This invention was made with government support under 70NANB14H012, awarded by the U.S. Department of Commerce, National Institute of Standards and Technology Center for Hierarchical Materials Design. The government has certain rights in the invention.

FIELD OF THE DISCLOSURE

The present disclosure generally relates to additive manufacturing systems and methods and, more particularly, to systems and methods for controlling temperature in additive manufacturing processes.

BACKGROUND

In certain additive manufacturing applications, it may be advantageous to control the temperature of the material and/or surrounding area when working with certain materials and/or build object geometries. Materials such as high carbon steel and titanium, for example, may be prone to cracking or other deformities when a high temperature gradient exists across the workpiece. As used herein, the term "high carbon steel" includes any steel having a carbon content equal to or greater than 0.2%. Alternatively, other materials may benefit from rapid cooling resulting which could result in smaller grain size or a desired material phase. Additionally or alternatively, the shape or geometry of the desired final build object may require a build strategy that may, for example, overheat thin features while forming adjacent thicker features. Furthermore, with uncontrolled cooling, in some applications, the additive manufacturing process can generate high residual stresses as a result of the geometry being built, the build strategy employed, use of materials with very different thermal expansions, or other factors. By controlling the cooling rate, these stresses can be gradually released as the part cools.

Current control and processing methods focus on phenomena local to the melt pool, and do not compensate for changing thermal gradients or cooling rates globally within the build. Although these current methods can improve build quality, it is only a partial solution toward achieving uniform microstructure, minimizing defects and residual stress, maintaining dimensional integrity, and optimizing mechanical properties.

The invention described herein establishes a mechanism and methodology for active thermal control to bound the thermal gradient and cooling rate within all areas of the additively manufactured build in progress that are above the critical temperature of the material. To enable this control methodology, new active temperature control functionality is added to the Direct Energy Deposition (DED) machine system utilizing a secondary heating source, cooling source and thermal measurement device.

A new control methodology is also included to calculate the position and intensity of the application of active heating or cooling. A dynamic thermal model of the build is developed that simulates the thermal history of the build and calculates the position and temperature of active thermal correction to be applied at each time step. The control system then commands and regulates the application of the thermal application at the specified temperature. This should enable active control of microstructure, geometry, porosity, material properties, residual stress and distortion.

SUMMARY

In a first aspect of the invention, a temperature control system is provided for controlling the temperature of a build during its fabrication in an additive manufacturing system. The temperature control system comprises a cooling source; and means for positioning the cooling source relative to the build. Preferably, but not necessarily, the temperature control system also includes a secondary heat source, separate from any heat source associated with the additive manufacturing system, for directing a heat flow to a selected portion of the build and means for positioning the secondary heat source relative to the build.

The secondary heat source may comprise one of a laser beam, an electron beam, mechanical engagement, an induction heater, a torch, a super-heated gas flow, or the like. In one non-limiting embodiment, the secondary heat source is a laser beam and the means for positioning the secondary heat source relative to the build includes a galvo-scanner.

The cooling source is configured to cool the build by one of forced convection, spray cooling, and via a material auxiliary to the build. The material auxiliary to the build comprises a cryogenic material. In one embodiment, the cooling source includes a nozzle for spraying a cooling liquid or gas, and the means for positioning the cooling source preferably comprises a robotic system.

The temperature control system may further comprise a heating and/or cooling plate that is applied to a substrate or previously built area of the build, with means for varying the temperature of the plate spatially and temporally being provided.

Preferably, but not necessarily, the temperature control system further comprises a programmable controller preprogrammed with a dynamic thermal model of a thermal history of the build for each time step and configured to control the secondary heat source and the cooling source to conform the temperature of the build to the thermal model.

One or more temperature sensing devices are provided for measuring the temperature of the build. Preferably, the temperature sensing device comprises one of an IR camera, a pyrometer, and a thermocouple.

DETAILED DESCRIPTION

Direct energy deposition (DED) is an additive manufacturing technique that enables the creation of multi-material, functionally graded components, the repair or modification of existing components, and the addition of wear resistant coatings. This additive manufacturing method creates a 3D object by depositing powder directly into a small molten pool generated by a laser beam to create solid material layer-by-layer. As successive layers are deposited, the heat is conducted into the previously deposited layers and the substrate material and the thermal gradient within the component decreases. As a result, the use of constant process parameters—such as laser power, powder flowrate and processing speed—does not result in constant thermal history throughout the build.

The thermal history generated by the additive manufacturing process is determinant of the resulting microstructure, geometry, material properties, residual stress and distortion. Thermal control of the process is necessary to achieve constant microstructure and material properties in the final part as well as reducing residual stress and warping.

By way of the present application, a mechanism and methodology are provided for active thermal control to bound the thermal gradient and cooling rate within all areas of the additively manufactured build in progress that are above the critical temperature of the material. To enable this control methodology, active temperature control functionality is provided to the DED machine system. In one embodiment, the active temperature control functionality utilizes a secondary laser, a cryogenic nozzle and a pyrometer.

The active heating or cooling implement may be positioned and controlled to achieve a desired temperature gradient or cooling rate. As used herein, the term "temperature gradient" is intended to encompass a desired rate of change of temperature spatially and the term "cooling rate" is intended to encompass a desired rate of change of temperature temporally. For example, the heating or cooling source may be controlled so that a selected area of the build object has a thermal gradient and or cooling rate maintained above and or below a desired threshold.

Figure 1:
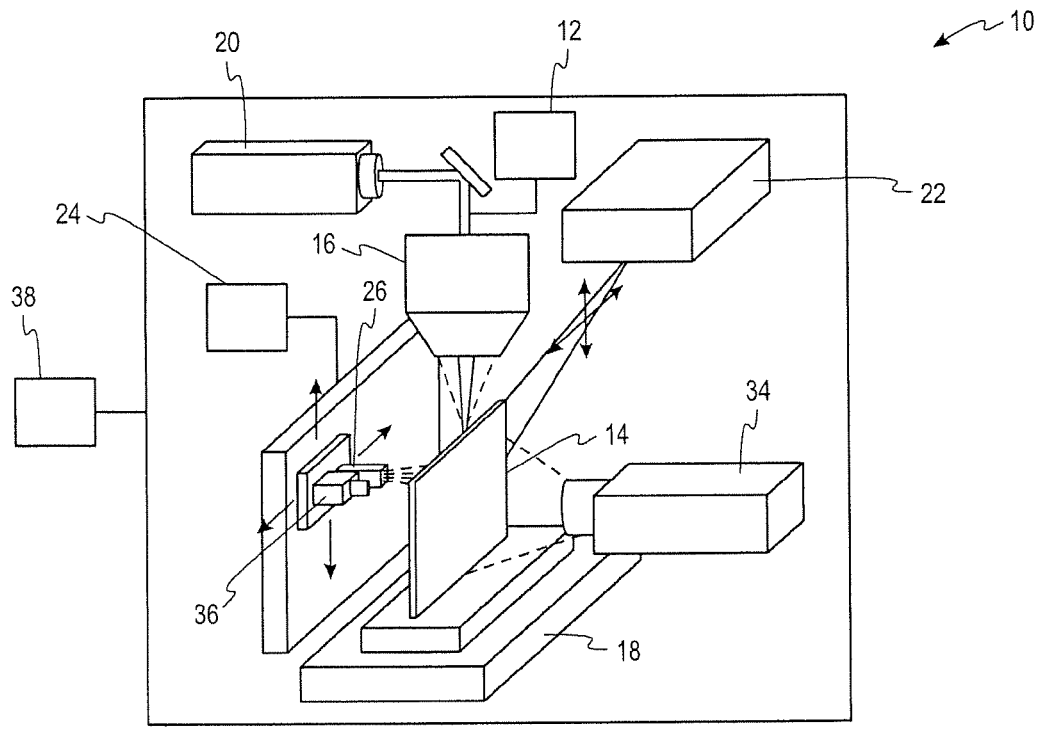
FIG. 1 is a schematic depiction of a DED manufacturing system utilizing a global thermal control system.

A schematic representation of the temperature control system in combination with an additive manufacturing system 10 is shown in FIG. 1. The system 10 comprises a primary heat source 12, such as a laser, for delivering laser energy to a workpiece or build 14 through a primary processing nozzle 16, the nozzle 16 being movable relative to the workpiece. The system 10 also includes sources of shield gas, metal powder, and carrier gas that are also flowed through the processing nozzle 16 to form a melt pool on the upper end of the workpiece 14. The workpiece 14 is supported on an active base plate 18 that provides for heating and cooling. The system 10 also includes a melt pool sensor 20 for providing information regarding the temperature of the melt pool.

A secondary heat source (or sources) 22 is provided which is in addition to the primary heat source 12 used for the additive process. The secondary heat source 22 is also positionable relative to the build 14. Any source of heating used may be used including an energy source such as a laser beam or electron beam as well as mechanical engagement to produce friction or an induction heater. For example, in the case of a secondary laser beam, beam position can be controlled by a galvo-scanner and independent motion system operating in parallel with the system for the primary heat source 12.

In addition, a cooling source 24 is provided that is also able to be positioned relative to the build 14. Sources of cooling may include forced convection, spray cooling, or conduction via material auxiliary to the build. Preferably the cooling source is an inert cryogenic gas, such as argon, that is delivered to the build through one or more nozzles 26. An independent motion or robotic system may be used to position the cooling nozzle 26. As noted previously, the cooling source may be used in the additive manufacturing system 10, regardless of whether the system 10 includes a secondary heat source 12.

Figure 2:
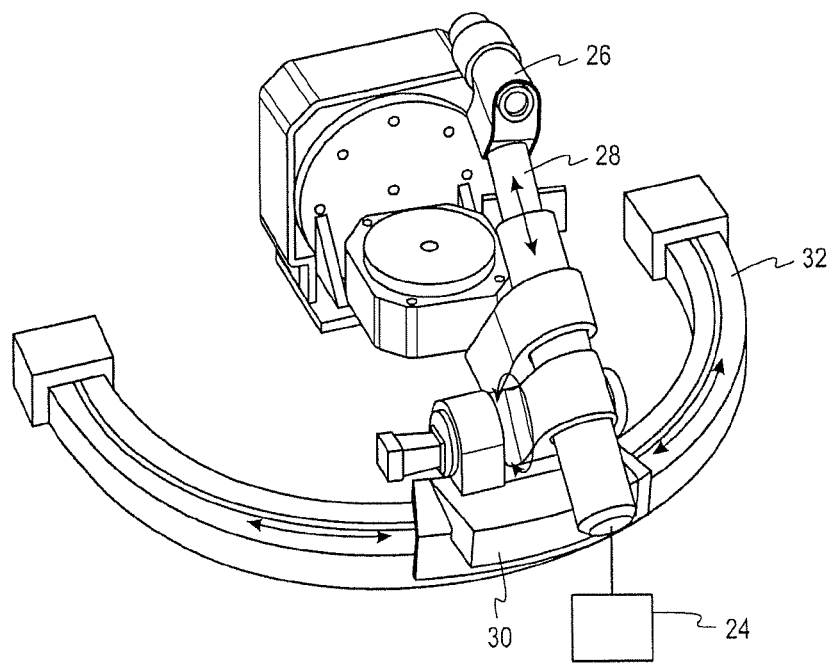
FIG. 2 is a positioning system for a cryogenic nozzle that may be used in the system depicted in FIG. 1.

With reference to FIG. 2, the nozzle 26 may be mounted to a telescoping arm 28 that is rotatably attached to a carriage 30, the carriage 30 being movable about the workpiece 14 along a track 32. Alternatively, a plurality of stationary nozzles may be provided that together provide for the delivery of a cooling liquid or gas, such as a cryogenic gas, to selected discrete areas of the entire workpiece. While not required, a pressure regulator is preferably provided that will allow increasing or decreasing the exit velocity of the cryogenic gas from the nozzle, to provide for a higher or lower cooling rate.

Some embodiments may include a heating and/or cooling plate applied to the substrate or previously built areas of the component. This plate may have the ability to vary temperature spatially and temporally, applying differing temperature profiles in space and time.

The temperature of the build object may be measured using a first temperature sensing device 34, which may be provided as one or more of any number of devices including but not limited to an IR camera, pyrometer, or thermocouple. A second temperature sensor 36, such as a pyrometer, is associated with the cooling nozzle 26 to measure the surface temperature of the workpiece as it is being cooled by the nozzle 26. Temperature measurement may not be necessary for all embodiments; specifically those utilizing simulation or experience to plan intensity and position of applied heating or cooling.

The system 10 includes a programmable controller 38. The controller 38 controls the operation of the DED system, including the intensities of the primary and secondary heat sources 12, 18 and the cooling source 24, and the positions of the primary processing nozzle 16, the secondary heat source 22, and the cooling nozzle 26 relative to the build based on signals received from the temperature sensors 34, 36 and the melt pool sensor 20.

Figure 3:
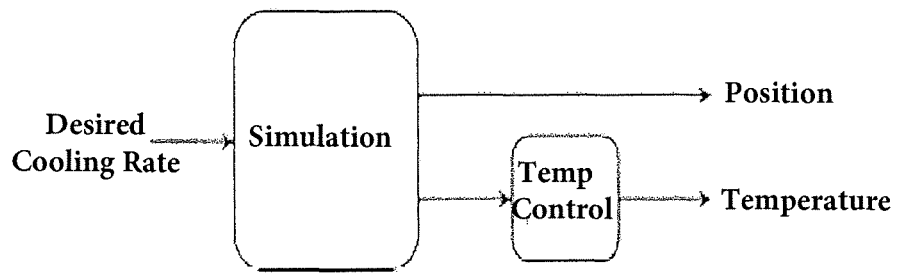
FIG. 3 is a schematic depiction of an open loop active thermal control for use in the system of FIG. 1.
Figure 4:
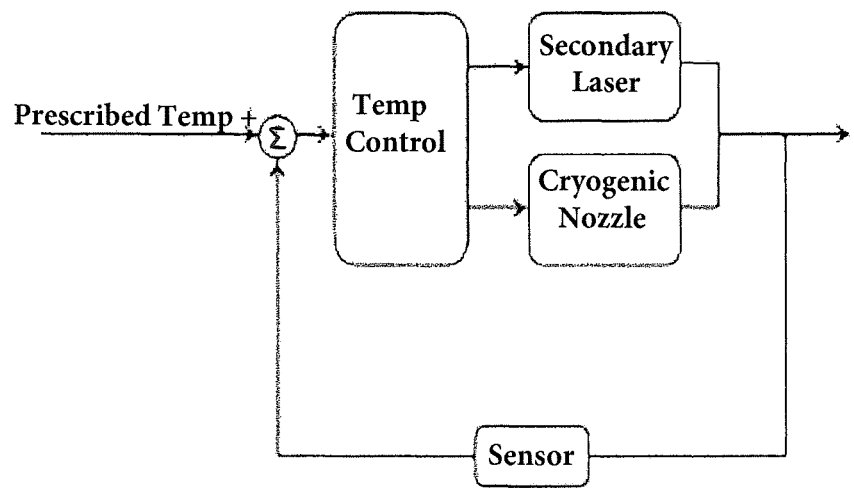
FIG. 4 is a schematic depiction of a closed loop active thermal control for use in the system of FIG. 1.

In some embodiments, the controller 38 includes a closed loop (FIG. 3) or open loop (FIG. 4) control system to control the position or intensity of the applied heating or cooling to maintain the thermal gradient or cooling rate within a specified range. Position and intensity of applied heating or cooling could also be controlled manually, by a time based sequence, or based on a methodology prescribed by simulation, as described below, or empirically through experience.

A simulation is performed to create control system for the DED process that can prescribe an open loop control solution that includes melt pool temperature control, base plate temperature control, and active global temperature control. This simulation predicts the position and temperature applied by the active control to maintain a constant thermal gradient throughout the build.

The simulation is used to create simplified model the thermal profile of a DED thin wall deposition temporally and spatially in 2-D. The creation of a 2-D thermal model is described below for illustrative purposes. However, is should be understood that, depending on the geometry of the build, a 3-D model of the thermal profile of the build would be required.

The thermal simulation for the build is performed in two spatial dimensions, along the build height direction and along the scanning direction. For the purposes of this simulation, it is assumed that the workpiece can move with respect to the processing head in the build scanning direction, X, and the build direction, Z. The simulation is time accurate, with element birth as time progresses. A combined finite difference and finite volume scheme is used to update the temperature at each point with in the thin wall during each time step. The model uses a 2-D heat equation to update the temperature within the build due to conduction, and then a finite volume method is used to further update temperature due to radiation. The bottom of the build is maintained at a user-defined temperature or temperature profile, the melt pool is maintained at a set melt pool temperature (melt pool thermal control is assumed to be implemented), and the sides are assumed to radiate to a thermal sink at room temperature.

As previously discussed, it is desirable to maintain a specific thermal gradient for the build while the temperature remains above some critical temperature. This critical temperature could be the lowest temperature at which the phenomena to be controlled (such as phase change or grain growth) occurs. The purpose of the control model is to solve for the position and temperature to be applied in order to maintain the thermal gradient above the desired temperature and within the desired bounds. This model is open loop with respect to determining the appropriate position and temperature to maintain the desired thermal gradient. More ideally, a closed loop model would be used. The temperature application is preferably a closed loop process to ensure that the prescribed temperature is applied. A schematic for the open loop active control solution can be seen in FIG. 3.

In 1-D, the desired thermal gradient and critical temperature and can be used to calculate a critical depth from the top of the build at which the material will be below the critical temperature, $$h_{crit} = \frac{T_{crit}}{dTdx}$$

where $T_{crit}$ is the critical temperature, and $dTdx$ is the desired thermal gradient. It is assumed that the spatial thermal gradient is proportional to cooling rate. To determine the amount of heating or cooling that would be required to achieve this critical temperature at the critical depth, a similar method is used as when updating the temperature due to radiative heat transfer. After the radiation update step, the amount of energy required is equal to $$q_{req} = (T\text{crit} - T(i)) * v * \rho * c_p$$

If the energy is positive, heating is required at the critical depth. If it is negative, cooling is required. After the energy is calculated, $T(i)$ is set to $T_{crit}$. If the total build height at a given time step is less than the critical depth, the substrate temperature is set to a higher temperature than room temperature. The substrate temperature then is:

$$T_{sub} = T_{crit} + (T_{add} - T_{crit}) * \frac{h_{build}}{h_{crit}}$$

where $h_{build}$ is the current height of the total additive manufacturing build. To expand this solution to 2-D, $h_{crit}$ must first be solved for each time step. This is the distance from cells that are at the upper critical temperature to the critical points at which heating or cooling must be applied to maintain the desired thermal gradient above the critical temperature. $h_{crit}$ is given by:

$$h_{crit} = \frac{(T_{add} - T_{crit})}{dTdxdy}$$

The control model will output points and temperatures; the global thermal control system will traverse these points and apply the prescribed temperature as the build progresses. The acceleration and feedrate of the heating and cooling elements will need to be taken into consideration as these points of traverse are determined to ensure that the hardware system does not lag far behind the simulation solution in execution. Assuming that the heating/cooling positioning devices can move much faster than the additive process, it is reasonable to expect that the heating or cooling can be applied to the $h_{crit}$ curve as it moves with the process.

The open loop prediction of the energy to be applied may be unreliable due to unknown laser absorption and convection coefficients. Thus, the closed loop control for the temperature is preferred to ensure that the prescribed temperature solution is applied. The closed loop control shown schematically in FIG. 4 takes as an input the prescribed temperature solution as predicted a-priori by the simulation described above. The error between the prescribed temperature and the actual temperature will be measured by a multicolor pyrometer. The control will then decide based on whether the temperature is predicted and detected to be above the desired temperature or below to apply heating, cooling, or nothing to the area of interest. If heating is required, the secondary laser will be activated. If cooling is required the cryogenic nozzle will be activated.

The cooling rate of a component is controlled to result in specific properties in the finished component. Properties such as tensile strength, fatigue life, creep rate, fracture behavior can be determined empirically, via micromechanics, and computationally if the structure of the component including details on the matrix, precipitates, phases, voids, grainsize and residual stress are known. This structure can be determined via a grain growth model and a solid phase transformation model from the thermal history including solidification rate, cooling rate, fluid flow, vaporization, and solute transfer. The thermal history can be determined from the process parameters via a part-scale heat conduction model, a melt pool scale thermos-fluid model, and a powder-scale thermos-fluid model. Once an ideal thermal gradient range is determined for a specific alloy and geometry via this simulation hierarchy, it can be input into the global thermal control model to prescribe a solution for that cooling rate.

The process is related to the thermal history via three models: a part scale heat conduction model, a melt pool-scale thermo-fluid model, a powder scale thermo-fluid model. An analytical or FEM model can be used to model part-scale heat conduction. A thermo-fluid model can be used to model the melt pool. Thermo-fluid model can be utilized to model powder-scale phenomena.

The thermal history is related to the structure via the combination of a grain growth model and a solid phase transformation model. A cellular automation technique can be used for the modeling of grain growth based on a known thermal history. Alternatively, the Monte Carlo model can be used to simulate grain growth. This grain growth model can be coupled with a solid phase transformation model, such as Computer Coupling of Phase Diagrams and Thermochemistry which represents thermodynamic properties for various phases, and a phase field model which can be applied to the solidification dynamics.

The structure is related to the properties empirically, via micromechanics, and computationally. Empirical methods include defining the Hall-Petch relationship for the material being built—which can predict yield strength based on grain size, creating a damage model to predict the fracture mechanics of the material, determining the Larson-Miller parameter to relate rupture life to temperature, and predicting creep damage via the Murakami method. Furthermore, within the realm of micromechanics, homogenization can be used to predict the response of the material based on the properties of the individual phases, a GTN model can be used to predict ductile fracture, a Dyson model can be used to predict creep damage based on dislocation structure, and a Fatemi-Socie model can be used to estimate multi-axial fatigue life. Finally, computational methods can be used to predict final properties by resolving grains, pores, inclusions and precipitates.

By quantitatively explaining via the models above how solidification rate and cooling rate affect final component properties, solidification rates and cooling rates can be chosen to create a component with ideal properties.

EXAMPLE

The purpose of this study was to relate the combined effects of solidification time and cooling time of the built material to its final ultimate tensile strength. Cooling time was defined as the time from when the location of interest last passes through 1,200° C. to when it reaches 400° C. Nine locations on a laser deposited IN718 thin wall were studied in detail to understand the effect of cooling rate on tensile strength. Tensile samples were machined at these locations. The thermal histories of the locations of interest were compared with build geometry and the ultimate tensile strength of that location. An inverse proportional relationship was seen between the distance of the location of interest from the substrate and the cooling time. A trend was also seen linking increased surface temperature and increased solidification time. Weighted Cooling And Solidification Time (WCAST) was defined as the sum of weighted normalized solidification time and the normalized cooling time. Ultimate tensile strength was seen to decrease as WCAST increased. Optical microscopy images of the build microstructure confirm that longer cooling and solidification times lead to coarser microstructures, which may cause the lower tensile strengths measured.

For this experimental study, a hybrid additive and subtractive five-axis machine tool, a DMG MORI LaserTec 65 3D, was used. The machine includes a direct diode laser with a maximum power of 2,500 W at a wavelength of 1,020 nm. The beam is focused by a lens with a 200 mm focal length to a 3 mm spot size. Gas atomized super alloy INCONEL 718 powder of particle size 50-150 μm was used. Argon gas with a flow rate of 7 L/min was used as the shield gas and the conveying gas to deliver the powder coaxially to the melt pool.

An IN718 thin wall was deposited on a stainless steel 304 substrate. The wall was 120 mm in length, 60 mm in height, and one track thick, or approximately 3 mm. A thin wall was chosen so that temperature can be assumed constant through the wall thickness. The programmed layer height was 0.5 mm. The wall was created using a zig-zag tool path with no dwell between layers. Between layers, the laser was off while the motion system traversed vertically to the next layer. The laser tool path was reversed at the end of the substrate, so acceleration and deceleration occurred within the tool path during the process. The laser power used was 1800 W, the powder flow rate was 18.0 g/min, and the scanning speed was 1,000 mm/min.

During the deposition, temperature measurements were performed using a digital infrared camera (FLIR A655sc). After deposition, the resultant thin wall was heat treated per the procedure in the ASM 5664 standard and miniatured ASTM E8 pin-loaded tensile specimens in the vertical (build) orientation were cut from the thin wall using EDM. The specimens were tested under displacement control using a miniature screw-actuated load frame under a quasi-static, pure tension loading at a nominal (crosshead) strain rate of $5e^{-4}$/sec.

The thermal histories of the locations of interest were compared, and a relationship was identified between the distance above the substrate and the cooling time. Specifically, the cooling time was longer for locations lower in the build because each subsequent layer added reheats the location, slowing the cooling. However, as the build height increases as new layers of material are deposited, heat is conducted into the substrate, which acts as a heat sink. As this heat accumulates, the thermal gradient decreases, and conduction is slowed. The effect of this is increasing temperature of the surface that each subsequent layer is deposited onto, because each previous layer cannot dissipate as much heat as the one before it. This results in increased solidification times for locations near the top of the build because the deposition surface temperature is higher. This is the opposite trend from that observed for cooling time.

The effect of proximity to the side edges of the build was also investigated. Dependent upon the toolpath used, proximity to the edge of the side wall does may have an effect on cooling time. More extreme thermal cycling resulted from a zig-zag toolpath used for the deposition. Such a toolpath allows for approximately equal dwell time between the deposition of subsequent layers in the locations in the center of the build, but the samples near the edge of the wall experience the deposition of two layers in quick succession and then a longer pause while the process moves to the other edge of the build. Since the passes for areas in the center of the wall are equally spaced, the surface of the previous layer is able to cool before the next layer is deposited. However, for areas near the edge, the first of the paired passes at the edge of the wall heats the deposition surface significantly without time to cool before the second pass. The result is that the deposition surface for the second pass of edge areas is significantly hotter than the surface of center areas resulting in slower solidification times.

Links between cooling time, solidification time and ultimate tensile strength (UTS) were examined. While no clear trend was seen between UTS and cooling time, or between UTS and solidification time, when the combined effect of both solidification time and cooling time was compared with UTS, a trend was observed. The solidification time was found to have a greater (1.7 times) the effect of cooling tome on the UTS.

From the experimentation, the following was observed: An inverse proportional relationship was seen between the distance of the location of interest from the substrate and the cooling time; A trend was observed linking increased surface temperature with increased solidification time; Ultimate tensile strength was seen to decrease as the Weighted Cooling And Solidification Time (WCAST) increased; and Longer cooling times and longer solidification times lead to coarser microstructures.

Accordingly, the systems and methods described above would allow for varying the thermal conditions in DED to create builds that have uniform or gradient mechanical properties.

The invention claimed is:
1. A temperature control system for controlling the temperature of a build during its fabrication in an additive manufacturing system, the temperature control system comprising: a. a primary heat source configured to deliver energy to the build through a primary processing nozzle; b. a secondary heat source separate from any heat source associated with the additive manufacturing system; c. means for positioning the secondary heat source relative to the build; d. a cooling source; e. means for positioning the cooling source relative to the build; and f. a melt pool sensor configured to provide information regarding temperature of a melt pool of the build; g. a first temperature sensor configured to provide information regarding temperature of the build; h. a second temperature sensor associated with the cooling source and configured to measure a surf ace temperature of the build as it is being cooled; i. a programmable controller; wherein the cooling source and means for positioning the cooling source are independent of the secondary heat source and any heat source associated with the additive manufacturing system; wherein the means for positioning the cooling source comprises a robotic system; wherein the robotic system further comprises a nozzle mounted to a telescoping arm; wherein the telescoping arm is rotatably attached to a carriage; and wherein the carriage is movable about the build along a track; wherein the programmable controller is configured to control an intensity of the primary heat source, an intensity of the secondary heat source, an intensity of the cooling source, a position of the primary processing nozzle, a position of the secondary heat source, and a position of the cooling source based on signals received from the melt pool sensor, the first temperature sensor, and the second temperature sensor to maintain a thermal gradient within a specified range for a selected portion of the build; wherein a simulation of the build is performed prior to initiating the build wherein the simulation outputs, position and intensity of applied heating and cooling and a predicted temperature for each selected portion of the build to maintain the thermal gradient within the specified range; and wherein a closed loop control is applied which compares the predicted temperature to a first temperature measured by the first temperature sensor, and to a second temperature measured by the second temperature sensor.

2. The temperature control system of claim 1 wherein the secondary heat source comprises one of a laser beam, an electron beam, and an induction heater.

3. The temperature control system of claim 1 wherein the secondary heat source is a laser beam and the means for positioning the secondary heat source comprises a galvo-scanner.

4. The temperature control system of claim 1 wherein the cooling source cools the build by one of forced convection, spray cooling, and via a material auxiliary to the build.

5. The temperature control system of claim 4 wherein the material auxiliary to the build comprises a cryogenic material.

6. The temperature control system of claim 1 further comprising a heating and/or cooling active base plate applied to a substrate or previously built area of the build.

7. The temperature control system of claim 6 wherein the active base plate is configured to vary temperature spatially and temporally.

8. The temperature control system of claim 1 wherein the programmable controller is pre-programmed with a dynamic thermal model of a thermal history of the build for each time step.

9. A temperature control system for controlling the temperature of a build during its fabrication in an additive manufacturing system, the temperature control system comprising: a. a primary heat source configured to deliver energy to the build through a primary processing nozzle; b. a secondary heat source separate from any heat source associated with the additive manufacturing system; c. means for positioning the secondary heat source relative to the build; d. a cooling source; e. means for positioning the cooling source relative to the build; and f. a melt pool sensor configured to provide information regarding temperature of a melt pool of the build; g. a first temperature sensor configured to provide information regarding temperature of the build; h. a second temperature sensor associated with the cooling source and configured to measure a surf ace temperature of the build as it is being cooled; i. a programmable controller; wherein the secondary heat source comprises one of a laser beam, an electron beam, and an induction heater; and wherein the cooling source cools the build by one of forced convection, spray cooling, and via a material auxiliary to the build wherein the cooling source and means for positioning the cooling source are independent of the secondary heat source and any heat source associated with the additive manufacturing system; wherein the programmable controller is configured to control an intensity of the primary heat source, an intensity of the secondary heat source, an intensity of the cooling source, a position of the primary processing nozzle, a position of the secondary heat source, and a position of the cooling source based on signals received from the melt pool sensor, the first temperature sensor, and the second temperature sensor to maintain a thermal gradient within a specified range fora selected portion of the build; wherein a simulation of the build is performed prior to initiating the build wherein the simulation outputs, position and intensity of applied heating and cooling and a predicted temperature for each selected portion of the build to maintain the thermal gradient within the specified range; and wherein a closed loop control is applied which compares the predicted temperature to a first temperature measured by the first temperature sensor, and to a second temperature measured by the second temperature sensor.

10. The temperature control system of claim 9 wherein the means for positioning the cooling source comprises a robotic system.

11. The temperature control system of claim 10 wherein the robotic system further comprises a nozzle.

12. The temperature control system of claim 11 wherein the nozzle is mounted to a telescoping arm.

13. The temperature control system of claim 12 wherein the telescoping arm is rotatably attached to a carriage.

14. The temperature control system of claim 13 wherein the carriage is movable about the build along a track and wherein the track forms arc shape.

15. The temperature control system of claim 9 further comprising a heating and/or cooling active base plate applied to a substrate or previously built area of the build.

16. A temperature control system for controlling the temperature of a build during its fabrication in an additive manufacturing system, the temperature control system comprising: a. a primary heat source configured to deliver energy to the build through a primary processing nozzle; b. a secondary heat source separate from any heat source associated with the additive manufacturing system; c. means for positioning the secondary heat source relative to the build; d. a cooling source; and e. means for positioning the cooling source relative to the build; f. a first temperature sensor configured to provide information regarding temperature of the build; g. a second temperature sensor associated with the cooling source and configured to measure a surface temperature of the build as it is being cooled; h. a programmable controller; wherein the cooling source and means for positioning the cooling source are independent of the secondary heat source and any heat source associated with the additive manufacturing system; wherein the means for positioning the cooling source comprises a robotic system; and wherein the robotic system further comprises a nozzle mounted to a telescoping arm; wherein the programmable controller is configured to control an intensity of the primary heat source, an intensity of the secondary heat source, an intensity of the cooling source, a position of the primary processing nozzle, a position of the secondary heat source, and a position of the cooling source based on signals received from the melt pool sensor, the first temperature sensor, and the second temperature sensor to maintain a thermal gradient within a specified range for a selected portion of the build; wherein a simulation of the build is performed prior to initiating the build wherein the simulation outputs, position and intensity of applied heating and cooling and a predicted temperature for each selected portion of the build to maintain the thermal gradient within the specified range; and wherein a closed loop control is applied which compares the predicted temperature to a first temperature measured by the first temperature sensor, and to a second temperature measured by the second temperature sensor.

17. The temperature control system of claim 16 further comprising a heating and/or cooling active base plate applied to a substrate or previously built area of the build.

* * * * *